(12) United States Patent
Sanders

(10) Patent No.: US 7,619,742 B2
(45) Date of Patent: Nov. 17, 2009

(54) HIGH-SPEED SPECTROGRAPHIC SENSOR FOR INTERNAL COMBUSTION ENGINES

(75) Inventor: Scott T. Sanders, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 120 days.

(21) Appl. No.: 11/770,325

(22) Filed: Jun. 28, 2007

(65) Prior Publication Data

US 2009/0002684 A1    Jan. 1, 2009

(51) Int. Cl.
*G01B 9/02* (2006.01)
(52) U.S. Cl. ........................ 356/451; 356/450
(58) Field of Classification Search ................ 356/451, 356/320, 450
See application file for complete search history.

(56) References Cited

U.S. PATENT DOCUMENTS

| | | | |
|---|---|---|---|
| 4,393,687 A | 7/1983 | Muller et al. | |
| 5,059,027 A * | 10/1991 | Roesler et al. | 356/456 |
| 5,922,948 A | 7/1999 | Lesko et al. | |
| 6,025,913 A * | 2/2000 | Curbelo | 356/453 |
| 6,370,486 B1 | 4/2002 | Sivathanu | |
| H2034 H | 7/2002 | Hopkins | |
| 6,468,069 B2 * | 10/2002 | Lemelson et al. | 431/12 |
| 6,593,573 B1 * | 7/2003 | McCann et al. | 250/339.12 |
| 6,640,199 B1 | 10/2003 | Goldstein et al. | |
| 6,668,630 B1 | 12/2003 | Kuglin et al. | |
| 6,903,822 B2 | 6/2005 | Kakuho et al. | |
| 7,395,699 B2 * | 7/2008 | Olcmen et al. | 73/114.23 |
| 7,499,169 B2 * | 3/2009 | Hurvitz et al. | 356/432 |
| 2006/0206255 A1 | 9/2006 | Olcmen et al. | |

OTHER PUBLICATIONS

Haller, Mirjam, PCT International Search Report, dated May 5, 2009, European Patent Office, Rijswijk, The Netherlands.
Rieker, G.B., et al., Rapid Measurements of Temperature and H20 Concentration in IC Engines with a Spark Plug-Mounted Diode Laser Sensor, Proceedings of the Combustion Institute, vol. 31, No. 2, Dec. 28, 2006, pp. 3041-3049, Elsevier, The Netherlands.
Waleski, Joachim W., et al., Development of Novel Hyper-Spectral Sensors and Associated Light Sources, Lasers and Electro-Opics and 2006 Quantum Electronics and Laser Science Conference, CLEO/QELS 2006, May 21, 2006, pp. 1-2, Conference on, IEEE, Piscataway, NJ, USA.
Hanson, R.K. et al., Diode Laser Sensors for Ground Testing, Collection of Technical Papers —25th AIAA Aerodynamic Measurement Technology and Ground Testing Conference, 2006, vol. 2, pp. 871-882, American Institute of Aeronautics, Inc., Reston, Virginia, USA.

* cited by examiner

*Primary Examiner*—Hwa S Lee (Andrew)
(74) *Attorney, Agent, or Firm*—Boyle Fredrickson, S.C.

(57) ABSTRACT

A high-speed absorption spectrographic system employs a slit-less spectroscope to obtain high-resolution, high-speed spectrographic data of combustion gases in an internal combustion engine allowing precise measurement of gas parameters including temperature and species concentration.

21 Claims, 2 Drawing Sheets

HIGH-SPEED SPECTROGRAPHIC SENSOR FOR INTERNAL COMBUSTION ENGINES

STATEMENT REGARDING FEDERALLY SPONSORED RESEARCH OR DEVELOPMENT

This invention was made with United States government support awarded by the following agencies: NSF 0238633. The United States has certain rights in this invention.

CROSS-REFERENCE TO RELATED APPLICATIONS

--

BACKGROUND OF THE INVENTION

The present invention relates to instruments for the study of combustion gases and in particular to an improved sensor system for providing high-speed optical measurements of combustion gas temperature, water mole fraction and the like.

Knowledge about combustion, including combustion temperature and combustion gas composition, can be important in the study and control of internal combustion engines. For this purpose of measuring combustion gas temperature, it is generally known to use an optical pyrometer observing light emitted from the combustion gases and/or materials contacting combustion gases. For example, U.S. Pat. No. 6,370,486 describes a sensor that measures infrared energy emitted at several preselected wavelengths from hot gas to calculate gas temperature.

A more sophisticated system is described in U.S. Pat. No. 6,640,199, which analyzes the emission spectrum of the combustion gases to deduce temperature and relative concentration of some chemical species making up the combustion gas.

SUMMARY OF THE INVENTION

The present invention provides a measurement of combustion gas temperature and species concentration using absorption spectroscopy techniques. In contrast to the measurement of emission spectra, such absorption spectroscopy requires the introduction of a known light signal into the combustion space and the extraction of sufficient energy at multiple light frequencies to perform the spectroscopic measurement. The present invention meets these requirements while using a light guide that may be as small as a fiber optic, by employing a sensing systems that eliminates the standard optical slit required of, for example, grating spectrometers. The elimination of the optical slit or similar aperture reducing structure improves the use of light energy and allows high-resolution spectrographs to be created at an extremely high rate.

Specifically, the present invention provides a high-speed spectrographic sensor for internal combustion engines having a plug receivable into a combustion chamber of an operating internal combustion engine and a light source providing light at multiple frequencies between 2000 and 3000 nm. A light guide, for example one or more optical fibers held by the plug, receives the light source to communicate the light into the combustion chamber for interaction with combustion gases. The light guide also communicates the light out of the combustion chamber for sensing. A sensor system distinguishes the strength of the light after interaction with the combustion gases at no less than twenty multiple frequencies and at a rate of no less than 1000 times per second.

Thus it is an aspect of at least one embodiment of the invention to provide real-time multi-spectral absorption measurements of combustion gases.

The sensor system may be a spatial heterodyne spectroscope receiving the light from the light guide after the light has passed through the combustion chamber.

Thus it is another aspect of at least one embodiment of the invention to provide for a spectrographic decomposition that avoids the energy loss incident to a standard slit or similar-type spectrometer. The spatial heterodyne spectroscope may operate with an input aperture that is as much as two orders of magnitude larger than a slit spectroscope.

The sensor system may further include a computer deducing and outputting temperature within the combustion chamber from the strengths of the multiple frequencies.

It is thus another aspect of at least one embodiment of the invention to provide for automatic temperature measurements of combustion gases.

The computer may deduce and output water concentration within the combustion chamber from the strengths of the multiple frequencies.

It is thus another aspect of at least one embodiment of the invention to provide for automatic measurements of water mole fractions.

The computer may deduce a physical parameter of combustion gases by matching the strengths of the multiple frequencies to corresponding multiple frequencies of signatures representing known different physical parameters within the combustion chamber.

It is thus another aspect of at least one embodiment of the invention to allow complex analysis of absorption spectra on an automatic basis.

The light source may provide frequencies substantially within a range of 2400-2600 nm.

It is thus another aspect of at least one embodiment of the invention to provide for absorption measurements in a novel frequency band for combustion gases.

The sensor system may distinguish the strength of no less than 100 multiple frequencies.

It is thus another aspect of at least one embodiment of the invention to provide for the measurement of high-resolution absorption spectra of combustion gases.

The sensor system may distinguish the strength of the multiple frequencies at no less than 10,000 times a second.

It is thus another aspect of at least one embodiment of the invention to provide for measurements that accurately capture the real-time dynamic process of combustion.

In an alternative embodiment, the sensor system may include a Fourier spectroscope positioned between the light source and the combustion chamber on the light guide. The Fourier spectroscope may measure and time-modulate the multiple frequencies passing into the combustion chamber. A demodulating intensity detector may be positioned on the light guide after the combustion chamber providing a time signal measuring a combination of the multiple frequencies and demodulating the time signal to distinguish the strength of the multiple frequencies.

It is thus another aspect of at least one embodiment of the invention to provide for a system that easily compensates for variation in the spectra of the exciting light signal.

The Fourier spectroscope may employ a photoelastic modulator to vary its effective optical length.

It is thus another aspect of at least one embodiment of the invention to provide a novel high speed Fourier spectroscope that can provide sufficiently fast measurements for combustion gas analysis.

The plug may be a spark plug providing a spark for the internal combustion engine.

It is thus another aspect of at least one embodiment of the invention to provide for measurement in the vicinity of the spark in operating the internal combustion engine.

These particular objects and advantages may apply to only some embodiments falling within the claims and thus do not define the scope of the invention.

DETAILED DESCRIPTION OF THE PREFERRED EMBODIMENT

Figure 1:
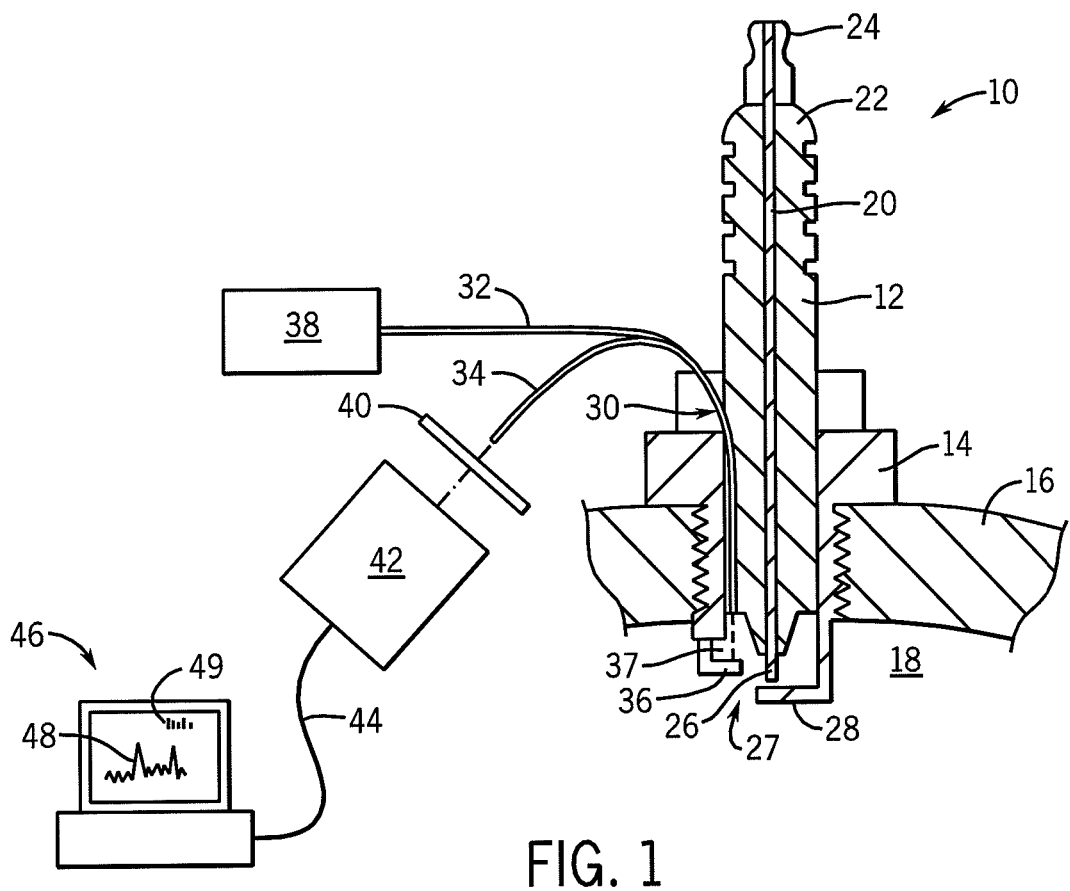
FIG. 1 is a cross-sectional view of a modified spark plug holding a light guide for receiving light to interact with combustion gases and transmitting the light back to a spectroscope for high-speed analysis.

Referring now to FIG. 1, a high-speed spectrographic sensor 10 of the present invention provides for a modified spark plug 12 that may be fit to a combustion chamber 18. In the manner of conventional spark plugs, the spark plug 12 may provide a conductive threaded flange 14 fitting within a corresponding threaded bore in the wall 16 of the combustion chamber 18, providing a seal therewith.

The spark plug 12 provides a center electrode 20 coaxially within a ceramic insulator 22 and passing from outside of the chamber 18 where it is accessible at a high-voltage terminal 24 to inside the chamber 18 where it extends out of the insulator 22 as an electrode tip 26. A ground electrode 28 extends from the flange 14 into the combustion chamber 18 to a point opposite the electrode tip 26 across a spark gap 27 in a manner known in the art.

The insulator 22 or threaded flange 14 also holds a light guide 30 passing through the insulator 22 or threaded flange 14 from outside the combustion chamber 18 to a point within the combustion chamber 18 near the spark gap 27. The light guide 30 may be, in a preferred embodiment, two adjacent optical fibers 32 and 34, one for carrying light into the combustion chamber 18 and one for carrying light out of the combustion chamber 18 for sensing.

The fiber 32 carrying the light into the combustion chamber 18 may receive light from a broad spectrum light source, such as an incandescent bulb in the form of a quartz tungsten-halogen lamp, or a wideband LED or broadband laser, providing substantial energy in the range of 2000 nm to 3000 nm and preferably in a range of 2400 nm to 2600 nm and having a known spectrum.

A mirror 36 is positioned across a gap 37 from the point where the light guide 30 terminates in the combustion chamber 18. The mirror 36 is positioned so that light passing through optical fiber 32 exits the light guide 30 and passes across the gap 37 to strike the mirror 36, to be reflected back across the gap 37 and be received by fiber 34. The optical path through the gap 37 may be as great as 10 mm to allow the light to interact with combustion gases in the region of the electrode tip 26.

Light received from optical fiber 34, after interacting with the combustion gases, passes through a filter 40, for example, a band limiting filter of the desired frequency range (e.g. 2400-2600 nm). The filtered light is then received by a spectrometer 42 which in the preferred embodiment is a spatial heterodyne spectrometer.

The spectrometer 42 provides a digitized output 44 received by a computer 46. The computer executes a program to display a high-resolution absorption spectrum 48 (based on known or measured spectrum of light source 38) extracted every 100 μs and no less than every 1000 μs and consisting of hundreds of resolved frequency points and no less then twenty resolved frequency points. The computer 46, operating according to the stored program, may also identify a quantitative parameter value 49, being for example a temperature of the combustion gases or a species mole fraction such as water concentration or other similar measurement, as will be described.

Figure 2:
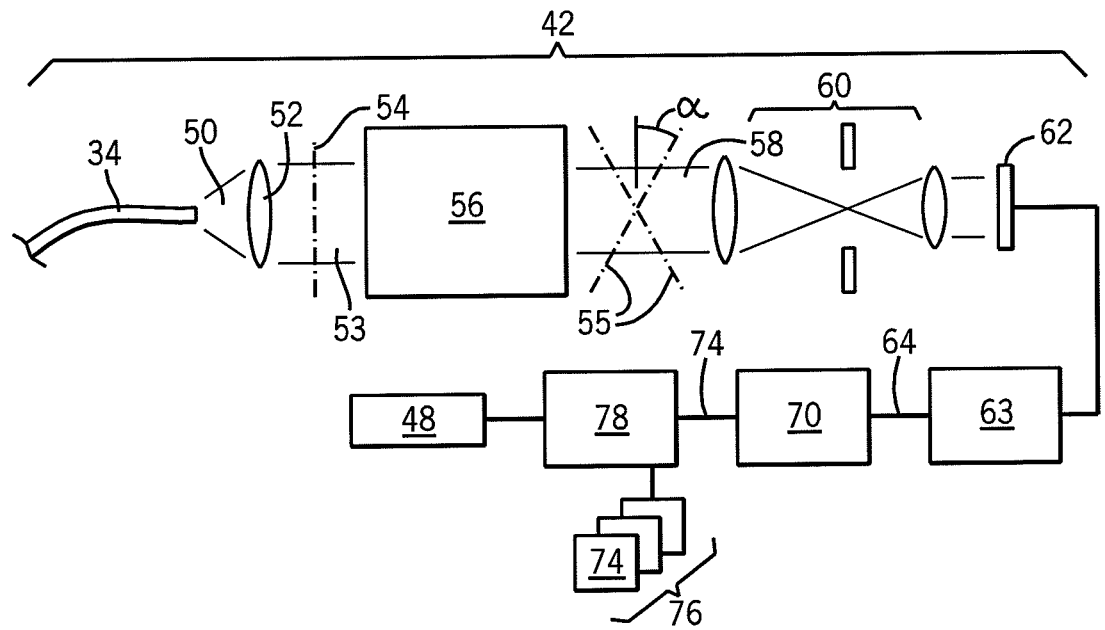
FIG. 2 is a block diagram of a spatial heterodyne spectrometer suitable for use as the spectroscope of FIG. 1.

Referring now to FIG. 2, the spatial heterodyne spectrometer 42 provides an open aperture and high-speed response made possible by its efficient use of minor energy obtained through fiber 34. Spectrometers of this type are described in U.S. Pat. No. 5,059,027, issuing Oct. 22, 1991, assigned to the assignee of the present invention, and hereby incorporated by reference. Such a spectrometer receives a light signal 50 from the fiber 34 and collimates this light using an optical assembly 52 to provide for a beam 53 having generally an aligned wavefront 54.

A dispersive optical system 56 tips the wavefronts 55 of each of multiple frequency component in the light signal 50 (only two shown) to an angle α dependent on the wavelength of that frequency component. The wavefront-modified beam 58 is then received by an imaging optical assembly 60 to project an image on a solid-state image detector 62 such as an extended InGaAs line scan camera commercially available from Xenics Leuven, Belgium. The signal from the solid-state image detector 62 may be digitized and sampled per block 63 to produce an image 64 at approximately 1000 times per second or as much as 10,000 times per second.

Figure 3:
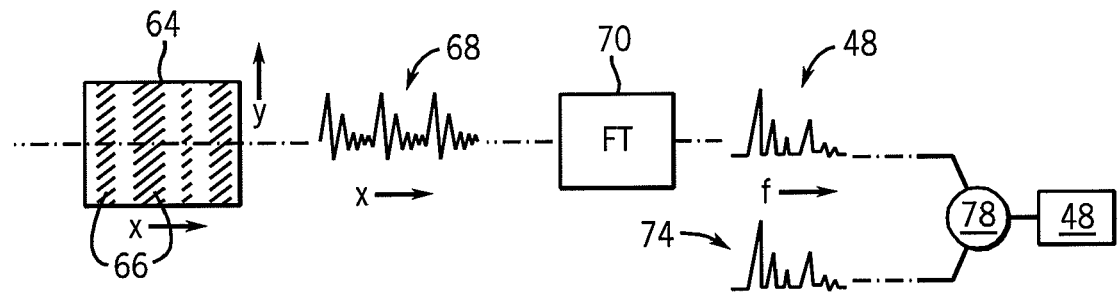
FIG. 3 is a diagram of the process steps of converting an image from the spatial heterodyne spectrometer into a spectrum and in performing signature matching.

Referring now also to FIG. 3, the image 64 from the solid-state image detector 62 will contain a series of bands of different intensities 66 caused by interference in the image produced by the constructive and destructive interference of the wavefronts 55 as tipped by dispersive optical system 56. The information of this image 64 may be collapsed to a single dimension (x) to produce a spatially dependent signal 68 with improved signal-to-noise ratio that better utilizes all of light energy from the fiber 34 both improving the speed and the resolving power of the spectrum.

This signal 68, when operated on by the Fourier transform 70, as may be implemented in the computer 46 of FIG. 1, produces a high-resolution spectrum 48 providing resolvable points for more than 100 different frequencies. The high-resolution spectrum 48 may be compared to spectrum 74 of a library 76 of different signature spectra 74 by a correlator 78, where each signature spectra 74 is associated with a known physical parameter that is to be extracted. For example, the multiple spectra 74 may each represent measurements of combustion gases at a different temperature. Alternatively the multiple spectra 74 may each represent a measurement of a different water concentration or another species concentration.

The correlator 78 finds the best correlation between high-resolution spectrum 48 and each of spectra 74 to output a measured temperature or other quantitative parameter value 49 as shown in FIG. 1, according to the parameter associated with the most highly correlated spectra 74.

Figure 4:
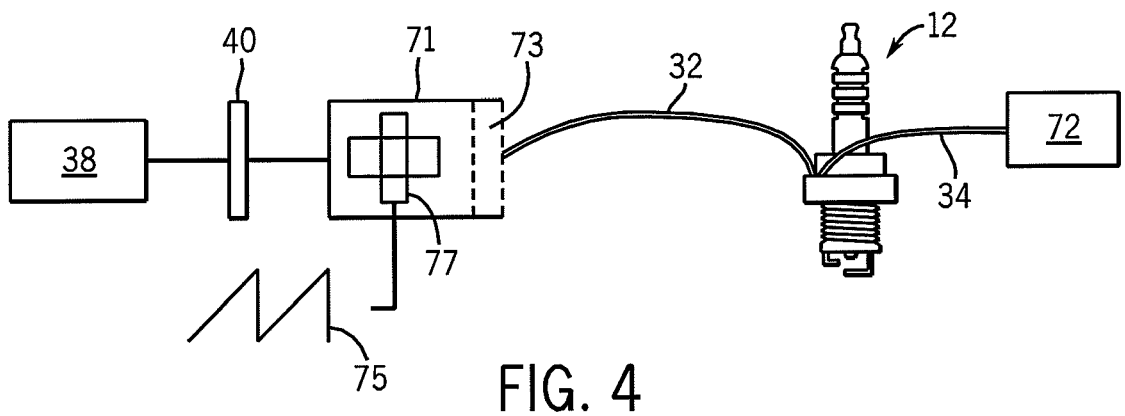
FIG. 4 is a block diagram of the alternative embodiment of the invention using the spark plug of FIG. 1 but employing a Fourier spectrometer upstream from the spark plug.

Referring now to FIG. 4, in an alternative embodiment the light source 38 provides light to a filter 40 operating in a manner described above with respect to filter 40 in FIG. 1. The filtered light is then provided to a Fourier spectrometer 71. The Fourier spectrometer 71 operates in a manner similar to conventional Fourier spectrometers by separating the light beam into two paths one of which is changed in effective length to create interference between the light of the two paths. The interference effectively modulates by frequency each of the wavelengths of light from the light source 38 with that wavelength having highest frequency being modulated at the highest rate. A Fourier transform of this modulation reveals the spectrum of the light. Ideally the changing cavity length is a simple linear function, for example, following a triangle or sawtooth wave 75.

The output of the Fourier spectrometer 71 is thus a modulated light beam which is sent to the fiber 32 and which may be sampled locally at a local sensor 73 to allow local characterization of the spectrum of the light before modification by combustion gases as will be described. The modulated light from the Fourier spectrometer 71 passes through the fiber 32 to the spark plug 12, as described above with respect to FIGS. 1 and 2, and is modified by combustion gases and received by fiber 34 ultimately to be provided to a sensor 72. Sensor 72 is not frequency discriminating and thus may employ an open aperture to efficiently measure multi-spectral light intensity. A Fourier transform of the modulated intensity at sensor 72 yields a spectrum which when compared to the spectrum calculated from the sensor 73 provides an absorption spectrum.

Referring still to FIG. 4, in order to provide the necessary speed and resolution for measuring combustion gases, the Fourier spectrometer 71 differs from those spectrometers of the prior art by eliminating a mechanically movable mirror or optical element that could not provide sufficiently responsive modulation. Instead the Fourier spectrometer 17 employs a non-mechanical cavity length control, for example, a photoelastic modulator 77 to provide for a sweeping of the cavity length at least 1000 times per second and as much as 10,000 times per second.

Figure 5:
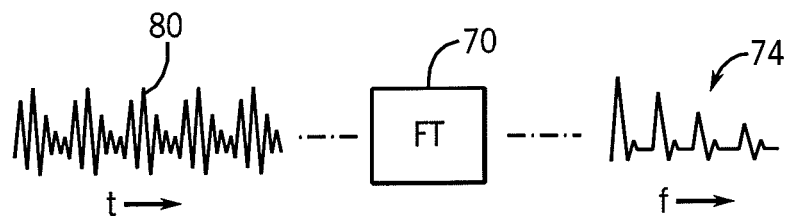
FIG. 5 is a figure similar to that of FIG. 3 showing those steps of signal analysis in the embodiment of FIG. 4 that differ from the embodiment of FIG. 1.

Referring to FIG. 5, the sensor 73 used in conjunction with the high speed Fourier spectrometer 71 thus produces a time signal 80 that provides a high resolution spectrum of more than 100 points at a sampling rate as described above.

The system of the present invention may be employed while the internal combustion engine is operating to measure gas temperatures in the vicinity of the electrode at an extremely high rate and accuracy. For example, it is beleived that a temporal resolution of 100 μs (~1 deg. crank angle) with a better than 4 cm$^{-1}$ spectral resolution to provide a temperature resolution of ~5 degrees C. or less than 0.1% to 1000K and 1% to 3000K.

It is specifically intended that the present invention not be limited to the embodiments and illustrations contained herein, but include modified forms of those embodiments including portions of the embodiments and combinations of elements of different embodiments as come within the scope of the following claims.

What we claim is:

1. A high-speed spectrographic sensor for internal combustion engines comprising:
   a plug receivable into a combustion chamber of an operating internal combustion engine;
   a light source providing light at multiple frequencies having wavelengths less than 3000 nm;
   a light guide held by the plug and receiving the light source to communicate the light into the combustion chamber for interaction with combustion gases and to communicate the light out of the combustion chamber for sensing; and
   a sensor system including a slit-less spectroscope receiving light from the light guide, the slit-less spectroscope attached to the light guide to receive light from the light guide directly also without an intervening slit; the spectroscope distinguishing strength of no less than 20 multiple frequencies of the light at a rate of no less than 1000 times per second after interaction with the combustion gases;
   wherein the spectroscope provides an optical system spatially separating multiple light frequencies as received simultaneously from the light guide after passage through the combustion chamber to permit simultaneous monitoring of the multiple frequencies at different spatial locations.

2. The spectrographic sensor of claim 1 wherein the slit-less spectrometer is selected from the group consisting of: a spatial heterodyne spectroscope and a Fourier spectrometer, the spectrometer receiving the light from the light guide after the light has passed through the combustion chamber.

3. The spectrographic sensor of claim 1 wherein the sensor system further includes a computer deducing and outputting temperature within the combustion chamber from the strengths of the multiple frequencies.

4. The spectrographic sensor of claim 1 wherein the sensor system further includes a computer deducing and outputting water concentration within the combustion chamber from the strengths of the multiple frequencies.

5. The spectrographic sensor of claim 1 further including a computer deducing a physical parameter of combustion gases by matching the strength of the multiple frequencies to corresponding multiple frequencies of signatures representing known different physical parameters within the combustion chamber from the strengths of the multiple frequencies.

6. The spectrographic sensor of claim 1 wherein the light source provides frequencies having wavelengths substantially within a range of 2400-2600 nm.

7. The spectrographic sensor of claim 1 wherein the sensor system distinguishes the strength of no less than 100 multiple frequencies.

8. The spectrographic sensor of claim 1 wherein the sensor system distinguishes the strength of the multiple frequencies no less than 10,000 times a second.

9. The spectrographic sensor of claim 1 wherein the sensor system includes:
   a Fourier spectroscope positioned between the light source and the combustion chamber on the light guide measuring and time-modulating the multiple frequencies; and
   a demodulating intensity detector positioned on the light guide after the combustion chamber providing a time signal measuring a combination of the multiple frequencies and demodulating the time signal to distinguish the strength of the multiple frequencies.

10. The spectrographic sensor of claim 9 wherein the Fourier spectroscope employs a photoelastic modulator to vary an effective optical length.

11. The spectrographic sensor of claim 1 wherein the plug is a spark plug providing a spark for the internal combustion engine.

12. A method of high-speed spectrographic sensing of combustion gases in an internal combustion engine comprising:
   (a) placing a plug in a combustion chamber of an operating internal combustion engine, the plug providing a light guide leading to within the combustion chamber;

(b) introducing light at multiple frequencies having wavelengths less than 3000 nm into the light guide to interact with combustion gases; and (c) receiving light from the plug through the light guide at a slit-less spectroscope attached to the light guide to receive light from the light guide directly also without an intervening slit;

(d) spatially separating multiple light frequencies as received simultaneously by an optical system of the spectroscope after passage through the combustion chamber to permit simultaneous monitoring of the multiple frequencies at different spatial locations; the spectroscope distinguishing strength of no less than 20 multiple frequencies of the light at a rate of no less than 1000 times per second after interaction with the combustion gases.

13. The method of claim 12 wherein the determining spatially heterodynes the light received after interaction with the combustion gases to determine attenuation of the multiple frequencies.

14. The method of claim 12 further including outputting temperature within the combustion chamber from the strengths of the multiple frequencies.

15. The method of claim 12 further including outputting water concentration within the combustion chamber from the strengths of the multiple frequencies.

16. The method of claim 12 further including matching the strength of the multiple frequencies to multiple signatures with similar multiple frequencies and representing known different physical parameters to deduce a physical parameter within the combustion chamber.

17. The method of claim 12 wherein the light includes frequencies having wavelengths substantially within a range of 2400-2600 nm.

18. The method of claim 12 wherein the attenuation of no less than 100 multiple frequencies is determined.

19. The method of claim 12 wherein the attenuation of the multiple frequencies is determined no less than 10,000 times a second.

20. The method of claim 12 further including measuring and time-modulating the multiple frequencies before the light interacts with the combustion gases; and demodulating a time signal derived from a strength of the multiple frequencies to distinguish the strength among the multiple frequencies after interaction with the combustion gases.

21. The method of claim 12 further including providing an ignition spark in the vicinity of the light guide within the combustion chamber.

* * * * *